Dec. 30, 1930. A. A. SIEVERT 1,786,677
AUTOMATIC ENSILAGE DISTRIBUTOR
Filed Oct. 17, 1929    2 Sheets-Sheet 1
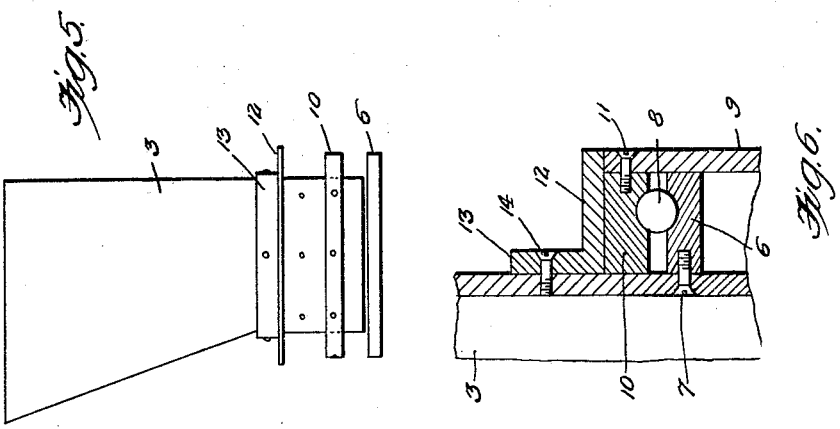
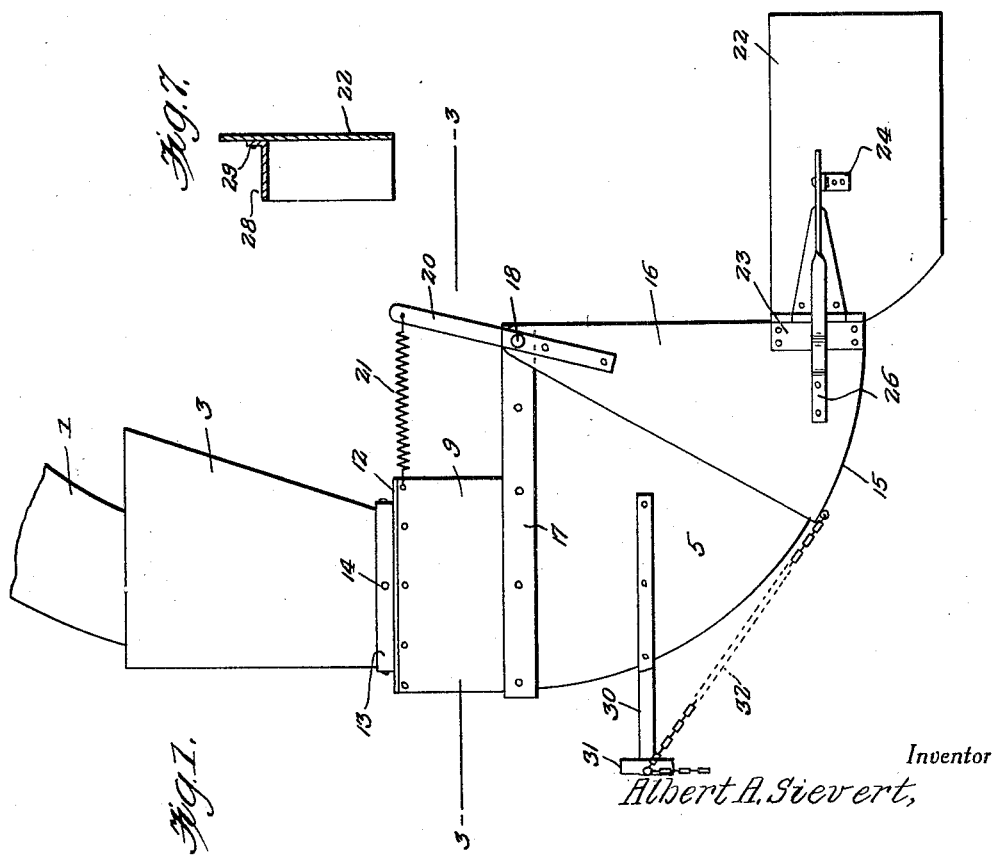
Inventor
Albert A. Sievert,
By Clarence A. O'Brien
Attorney

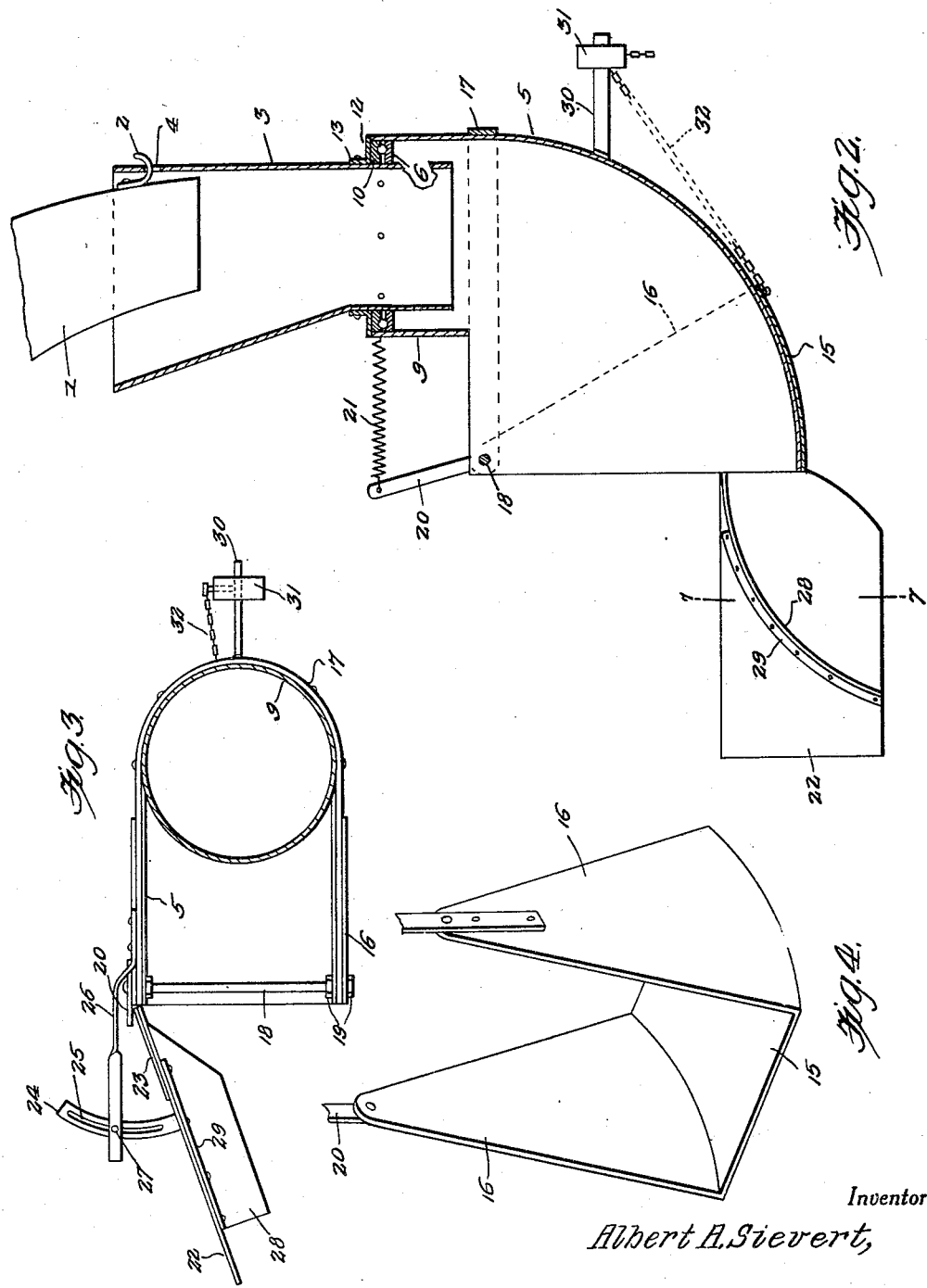

Patented Dec. 30, 1930

1,786,677

UNITED STATES PATENT OFFICE

ALBERT A. SIEVERT, OF KAUKAUNA, WISCONSIN

AUTOMATIC ENSILAGE DISTRIBUTOR

Application filed October 17, 1929. Serial No. 400,263.

This invention relates to automatic ensilage distributors and more particularly to devices of this character which are especially adapted for attachment to the discharge end of blower pipes wherein a pneumatic conductor is utilized for the purpose of elevating ensilage in a silo for the purpose of storage.

An important object of the invention is to provide, in a manner as hereinafter set forth, an automatic ensilage distributor of the aforementioned character which embodies means for rotatably mounting same on the discharge end of the blower pipe and wherein means are provided for actuation by the air and ensilage discharging therefrom to cause the distributor to rotate in a manner to distribute said grain evenly in the silo and thus do away with the necessity for an operator to be stationed therein for the purpose of distributing the ensilage.

Another object of the invention is to provide, in a manner as hereinafter set forth, an automatic distributor of the aforementioned character wherein the means which is actuated by the blast from the blower pipe, may be expeditiously adjusted for regulating the speed at which the distributor will rotate.

Other objects of the invention are to provide, a distributor of the aforementioned character, which will be simple in construction, strong, durable, efficient in its use, and which may be manufactured at low cost.

Other objects and advantages of the invention will become apparent from a study of the following specification, taken in connection with the accompanying drawings, wherein like characters of reference designate corresponding parts throughout the several views, and wherein:

Figure 1 is a view in side elevation of an automatic ensilage distributor constructed in accordance with this invention.

Figure 2 is a vertical sectional view thereof.

Figure 3 is a horizontal sectional view taken approximately on the line 3—3 of Figure 1.

Figure 4 is a perspective view of the adjustable discharge plate or lip, the lower fragment only of the actuating levers for same being shown.

Figure 5 is a view in side elevation of the funnel which is suspended from the blower pipe and the ball races which are connected thereto for rotatably supporting the distributor, the latter being shown separated from the funnel.

Figure 6 is an enlarged view in vertical section showing a fragment of the rotary bearing connection for connecting the distributor head and the funnel together.

Figure 7 is a cross section taken approximately on the line 7—7 of Figure 2 showing the arcuate ensilage deflector mounted on the adjustable actuating baffle.

Referring to the drawings in detail, the reference character 1 designates the discharge end of a blower pipe to which is connected, adjacent its lower end, a hook 2.

The device comprising this invention includes a funnel 3 having an opening 4 adjacent its top for the reception of the hook 2 for the purpose of suspending said funnel from the blower pipe 1. It is understood of course that any desired number of hooks 2 and openings 4 may be provided. An elbow 5 is rotatably suspended from the lower end portion of the funnel 3 and to this end said funnel 3 is provided adjacent its lower end, with an annular ring or flange 6 which is connected thereto through the medium of the screw 7 and has formed in its upper face an annular groove for the reception of a plurality of ball bearings 8. As seen most clearly in Figure 2 of the drawings, the lower end of the funnel extends downwardly into the elbow.

The upper end of the elbow 5 is in the form of an annulus 9 which extends above the bearing ring 6 and has secured to its inner periphery a complemental bearing ring 10 having a ball receiving groove in its lower face for the reception of the ball bearings 8 and said ring 10 is secured to the annulus 9 by the screws 11.

For the purpose of retaining the ring 10 of the ball bearings 8, a flange 12 having an upturned securing portion 13 is secured on the funnel 3 through the medium of the securing elements 14 and in slidable engagement with the upper face of said ring 10. The elbow 5 extends forwardly from the annulus 9 and the upper portion thereof which is forward of said annulus is open, the forward end of said elbow also being entirely open for the discharge of the ensilage.

A substantially U-shaped adjustable discharge lip or plate is designated by 15 and is of a longitudinal shape to conform to the contour of the elbow 5. The discharge lip 15 is provided with upstanding arms 16 which embrace the forward end of the elbow 5 therebetween. A substantially U-shaped metallic band 17 embraces the portion of the elbow 5 immediately below the annulus 9 and has its forward end terminating substantially flush with the forward end of the elbow, as clearly shown in the drawings.

The arms 16 of the adjustable lip 15 are pivotally connected to the forward end of the band 17 and the adjacent portion of the elbow 5 through the medium of a transversely extending shaft 18 which passes therethrough and is secured in place by the nut 19. A pair of arms 20 extend upwardly from the arms 16 and have connected thereto the forward ends of a pair of pull springs 21, the opposite ends of which are anchored to the annulus 9 and normally retain or urge the lip 15 forwardly on the elbow 5.

An actuating vane or plate 22 is hingedly connected by the hinge 23 to the forward edge of one of the arms 16 at its lower end and extends forwardly therefrom in a vertical plane. The vane 22 is adapted to be swung inwardly across the open forward or discharge end of the elbow 5 and for the purpose of securing same in any desired position, an arcuate arm 24 is secured to the outer side thereof and is provided with an elongated slot 25. A laterally and forwardly extending arm 26 is mounted on the arm 16 to which is conected the hinge 23 and said arm 26 intersects the arm 24 on the vane and has mounted therein a securing or clamping element 27 which extends through the slot 25 of the arm 24 and is adapted to frictionally secure the arms together against relative movement and thus secure the vane in adjusted position.

A forwardly and downwardly extending arcuate deflecting rib 28 is mounted on the inner side of the vane 22 through the medium of an upturned flange 29 through which extends securing elements for anchoring the rib or flange 28 to the vane. The rib 28 extends from the upper rear portion of the vane to the lower edge thereof adjacent the forward end of said vane and is adapted to deflect a portion of the ensilage discharged from the elbow 5 downwardly.

A horizontal arm 30 extends rearwardly from the elbow 5 and has mounted thereon a counterweight 31 for the purpose of balancing the weight of the elbow 5 on the funnel 3. For the purpose of retaining the adjustable lip 15 in any desired position against the tension of the pull springs 21, a retaining chain 32 is connected thereto and has its free end adjustably secured on the weight 31.

In the operation of the distributor, the elements are assembled as shown in the drawings and when the machine upon which it is mounted is in operation, the blast of air and the ensilage emerging from the blower pipe 1 enter the funnel 3 and pass into the elbow 5. The air and ensilage emerge from the open forward end of the elbow 5 with considerable force and impinge against the laterally extending vane 22 with the result that said vane and the elbow will be rapidly rotated on the bearings 8, as will be understood. Rotation of the elbow 5 will cause the ensilage discharged therefrom to be whirled around in the silo and be thus evenly distributed, and the rib 28 will deflect the portion of the ensilage downwardly in order that the center of the silo will be filled at the same time.

The speed at which the distributor rotates may be adjusted by regulating the angle of the vane 22 with respect to said elbow, the greater the angle of said vane, the harder the blast and grain will impinge thereagainst and consequently the more rapidly will the elbow be rotated. The distribution of the ensilage may be further regulated through the medium of the discharge lip 15 as it will be apparent that by retracting said lip to the position shown in Figure 2 of the drawings, the ensilage will be thrown a comparatively short distance from the distributor and if the retaining chain 32 is released in a manner to permit the spring 21 to swing the discharge lip forwardly, it will be apparent that by so extending the length of the elbow, the distance to which the ensilage will be thrown will be considerably lengthened.

It is believed that the many advantages of an ensilage distributor constructed in accordance with this invention will be readily understood, and although the preferred embodiment of the invention is as illustrated and described, it is to be understood that changes in the details of construction may be had which will fall within the scope of the invention as claimed.

What is claimed is:

1. An ensilage distributor of the character described comprising an intake funnel adapted for connection with a blower pipe, an ensilage distributing elbow rotatably suspended from the funnel, an adjustable discharge lip pivotally mounted on the forward end of the elbow, and an adjustable actuating vane mounted on the discharge lip for engagement by the air blast and ensilage from the elbow for the purpose of rotating same on the funnel.

2. An ensilage distributor of the character described comprising a funnel adapted for connection with the discharge end of an ensilage blower pipe, a distributing elbow rotatably suspended from the funnel, a longitudinally adjustable discharge lip pivotally mounted on the distributing elbow, a laterally adjustable forwardly extending vane hingedly mounted on the discharge lip and adapted to be engaged by the air blast and ensilage from the distributing elbow, and a downwardly curved grain deflecting rib mounted on the vane.

3. An ensilage distributor of the character described comprising an intake funnel adapted for suspension from the discharge end of an ensilage blower pipe, a distributing elbow rotatably mounted on the lower end of the funnel, a longitudinally shiftable discharge lip pivotally mounted on the forward end of the elbow, resilient means for normally urging the discharge lip forwardly of the elbow, means for maintaining the discharge lip in adjusted position, a vane pivotally mounted on the discharge lip and extending forwardly therefrom and adapted to be swung in a horizontal plane thereon in a manner to be engaged by the air blast and ensilage from the distributing elbow, co-acting means carried by said vane and the adjustable discharge lip for maintaining the vane in adjusted position, and a downwardly curved ensilage deflecting rib mounted on the vane for directing a portion of the discharged ensilage downwardly.

In testimony whereof I affix my signature.

ALBERT A. SIEVERT.